United States Patent
Vaughan et al.

Patent Number: 6,005,550
Date of Patent: Dec. 21, 1999

[54] AUTOMATIC CURSOR PARKING TO HIDE A MOUSE POINTER

[75] Inventors: Mark P. Vaughan, Spring; Kevin J. Brusky, Magnolia, both of Tex.

[73] Assignee: Compaq Computer Corporation, Houston, Tex.

[21] Appl. No.: 08/829,204

[22] Filed: Mar. 31, 1997

[51] Int. Cl.$^6$ .................................................. G09G 5/08
[52] U.S. Cl. ........................ 345/157; 345/145; 348/552
[58] Field of Search .................................. 345/145–146, 345/172, 157, 158, 168, 327, 431, 156, 136, 339, 213, 132, 127; 348/10, 552, 553, 731, 734, 485; 364/705.05; 379/93.19

[56] References Cited

U.S. PATENT DOCUMENTS

| | | |
|---|---|---|
| 5,559,533 | 9/1996 | Hicok et al. ............................. 345/162 |
| 5,561,709 | 10/1996 | Remillard .............................. 379/93.19 |
| 5,585,858 | 12/1996 | Harper et al. ............................ 348/485 |
| 5,646,647 | 7/1997 | Chow ...................................... 345/145 |

Primary Examiner—Richard A. Hjerpe
Assistant Examiner—Frances Nguyen
Attorney, Agent, or Firm—Jenkens & Gilchrist, P.C.

[57] ABSTRACT

The present invention includes an event detector for detecting selected events occurring in a computer system which are programmed to automatically move a cursor image from a viewing area of a video display to an overscanned area of a video display. The invention further includes a cursor controller for generating the cursor image and controlling movement of the cursor image on the video display. The cursor controller automatically places the cursor image in the overscanned area of a video display when the event detector detects the occurrence of a selected event. Alternatively, the event detector can include a timer for delaying the notification of detection to the cursor controller of the selected event.

19 Claims, 3 Drawing Sheets

AUTOMATIC CURSOR PARKING TO HIDE A MOUSE POINTER

FIELD OF THE INVENTION

The present invention pertains in general to control of cursor movement, and more particularly, to the automatic placement of a cursor in an overscanned area of a video display in response to selected events occurring on a computer system.

BACKGROUND OF THE INVENTION

A personal computer/television (PC/TV) convergence device is a fully functional computer integrated with television functionality, providing television viewing (via broadcast, cable, Digital Satellite, or other broadcast media) and personal computing functionality. This convergence of computer and television functionalities provide a user with combined access to television program information and computer and Internet information.

Since the PC/TV convergence device is controlled by the computer's operating system, the PC/TV convergence device can, among other things, display personal computer (PC) applications and television programs on a single monitor. The convergence of the personal computer and the television into a single device also permits the utilization of the communications bandwidth, mass storage and graphics of the computer to deliver, store and display applications during a traditional television viewing environment.

The PC/TV convergence device is a user interactive device. For example, if a user is watching a television program, the PC/TV convergence device will enable the user to download information about that particular program, such as from a web site where additional information about or related to the program might be located. In general, the PC/TV convergence device can be operated in a variety of modes including, but not limited to, a personal computer mode, a television mode, or a combined personal computer and television mode. Often, images displayed on the television functionality include an image of a cursor. Following certain events, such as when switching to the television mode for viewing full motion video images, it is desirable for the cursor to be removed from the viewing area. Currently, this requires the user to manually move the cursor off the viewing area. It would be advantageous, therefore, to devise an apparatus and method whereby the cursor image is automatically placed out of sight in an overscanned area of a video display when these events occur.

SUMMARY OF THE INVENTION

The present invention is an apparatus and method for use in a computer system, such as in a PC/TV convergence device, which automatically places a cursor image in an overscanned area of a video display following the occurrence of selected events. The present invention includes a cursor controller for controlling the generation and movement of the cursor image and an event detector or controller programmed to detect events which signal the display of images best viewed with the cursor image hidden in the overscanned area of the video display. Upon detection of the selected events, the event detector or controller instructs the cursor controller to automatically place the cursor image in the overscanned area of the video display. The invention can also include a timer for delaying, by a predefined or a user selectable period of time, placement of the cursor image in the overscanned area of the video display following detection of the selected events.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

With reference now to the figures there are depicted block diagrams of the present invention. The purpose of these block diagrams is to illustrate the features of the invention and the basic principles of operation of an embodiment thereof. These block diagrams are not necessarily intended to schematically represent particular modules of circuitry or any particular data or control paths.

Figure 1:
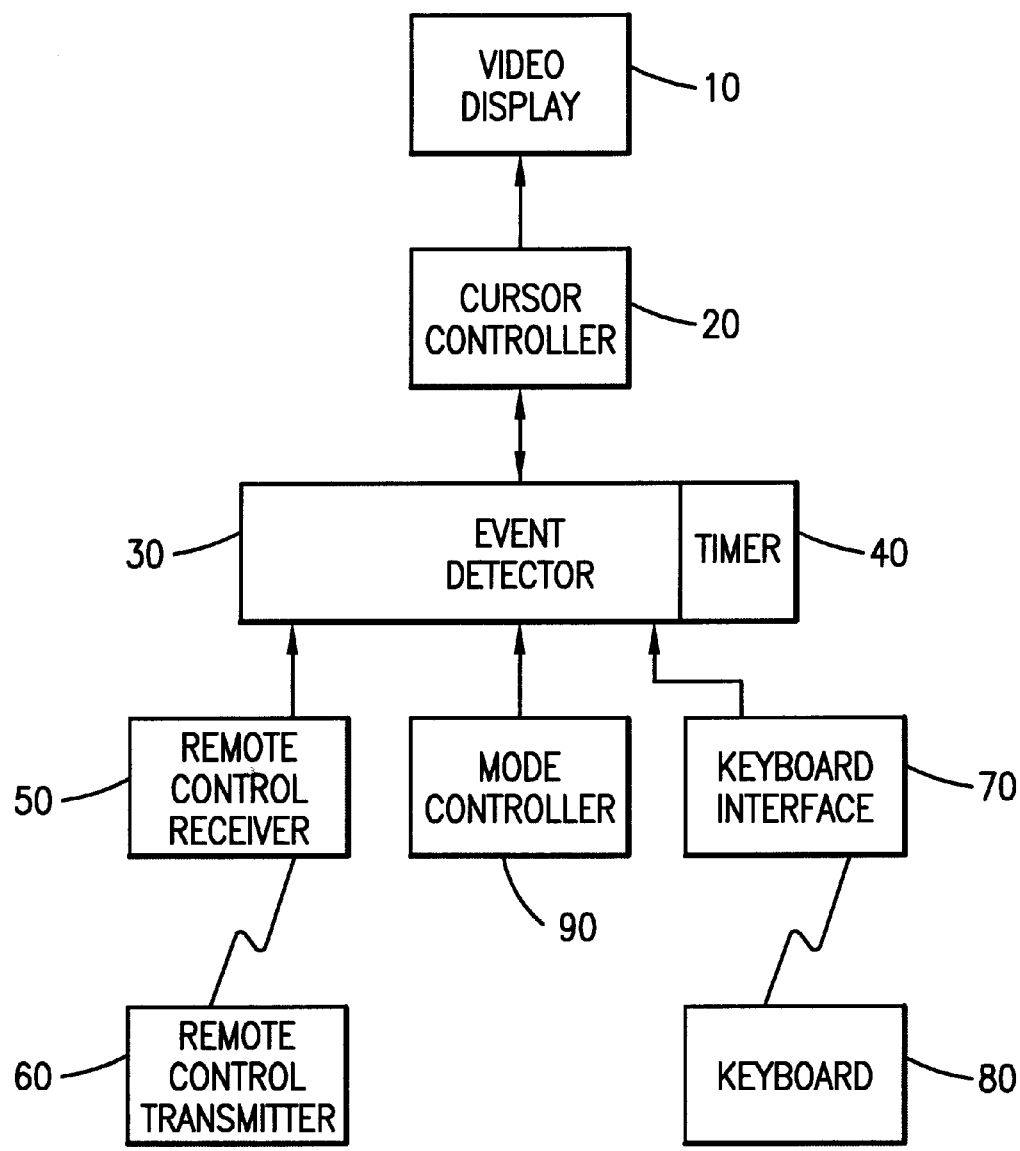
FIG. 1 is a functional block diagram of the present invention for general use in any computer system.

Referring now to FIG. 1, there is illustrated a functional block diagram of the present invention for use in a computer system. The present invention includes a cursor controller 20 for generating, and controlling the movement of, cursor images on a video display 10. The cursor controller 20 is capable of automatically placing the cursor image in an overscanned area of the video display 10 at the direction of an event detector 30. Overscanned areas of video display are well known in the art and generally refer to areas on the periphery of a video image which are located beyond the actual display area of the video display. Images located in this area are effectively invisible though still part of the image which is generated for display.

In certain circumstances, such as when displaying motion video, it is desirable not to view the cursor image. An easy way to remove the cursor image from view, while not actually deleting the cursor image from the display image, is to place the cursor image in the overscanned area of the video display 10. Since the cursor image remains part of the display image, the user may move the cursor image back onto the display area where it becomes visible simply by moving a mouse or pointer associated with the cursor. The event detector 30 is programmed to detect the occurrence of such selected events and communicates the occurrence of the event to the cursor controller 20. The selected events can be triggered in a variety of ways including user commands and entries communicated to the computer system via the remote control transmitter 60, user commands and entries communicated to the computer system via the keyboard 80, or changes in the operating mode of the computer either as a result of a user initiated changes or by a computer system initiated change.

The event detector 30 is notified by the remote control receiver 50 of user commands and entries communicated to the computer system via a remote control transmitter 60. In a similar manner, the event detector 30 is notified by the keyboard interface 70 of user commands and entries communicated to the computer system via the keyboard 80. The event detector 30 is further notified by the mode controller 90 of changes in the operating mode of the computer system. Changes in mode of operation can be initiated by the user or can be a result of the programming of the computer system.

The event detector 30 is programmed either by the computer system manufacturer or by the user to detect the occurrence of selected events which are desired to result in placement of the cursor image in the overscanned area of the video display 10. When such an event occurs the event detector 30 instructs the cursor controller 20 to place the cursor in the overscanned area of the video display 10. Additionally, the event detector includes a timer 40 which is used to time a delay period between the detection of selected events and the issuance of an instruction to the cursor controller 20. The timer 40 can be preset by the manufacturer or can be selectively set by the user. The delay allows the cursor image to remain in the viewing area for a period of time following occurrence of the selected event.

Figure 2:
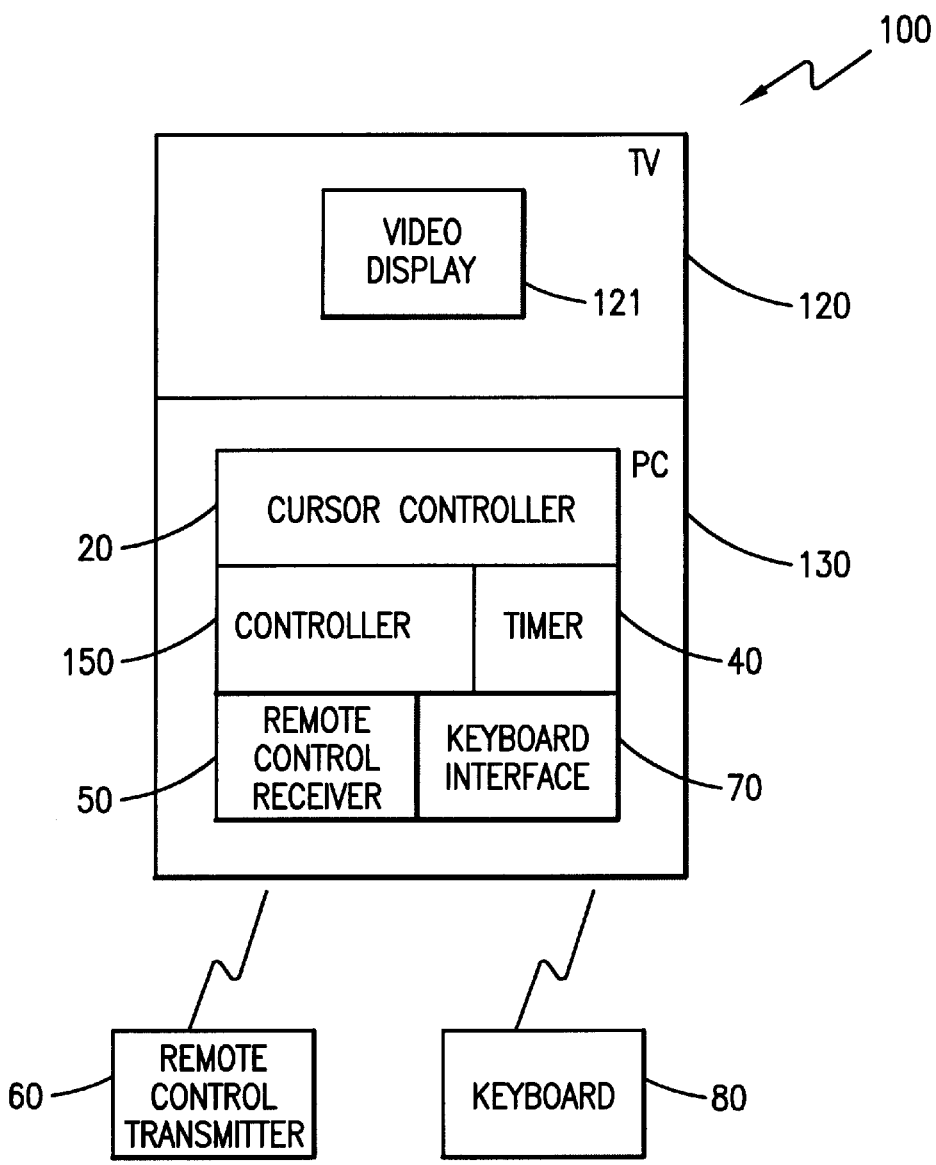
FIG. 2 is a functional block diagram of a PC/TV convergence device incorporating the present invention.

Referring additionally now to FIG. 2, there is illustrated a functional block diagram of a PC/TV convergence device 100 incorporating the present invention. The PC/TV convergence device 100 includes a coupled television functionality mode 120, a video display 121, and a computer 130. Included in the computer 130 are a cursor controller 20, a controller 150, a timer 40, a remote control receiver 50 receiving user inputted commands and entries from a remote control transmitter 60, and a keyboard interface 70 receiving user inputted commands and entries from a keyboard 80. Although these functions are shown as being separate functions within the computer 130 of the PC/TV convergence device 100 it is understood that these functions may reside in either the television functionality 120 or the computer 130. Furthermore, the functions represented by the functional block diagrams need not be implemented in distinct hardware but may use shared hardware or be implemented in software running an the computer 130.

In general, the PC/TV convergence device 100 can be operated in a variety of modes including, but not limited to, a personal computer mode, a television mode, or a combined personal computer and television mode. When in the personal computer mode the video display 121 displays images processed by the computer 130. While in the television mode the video display 121 displays images processed by the television functionality 120. When in the combined personal computer and television mode, the video display 121 displays images processed by the computer 130 and the television functionality 120. The image to be displayed often includes a cursor image.

The cursor controller 20 generates a cursor image and moves the cursor image around the video display 121. Typical uses for the cursor image include selecting items from a menu on the video display 121 or to move an image around the video display 121 (for example, to move a picture within a picture around the video display 121). In certain situations, such as while watching motion video in the television mode, it is desirable to remove the cursor image from the viewing area of the video display 121. The controller 150 is programmed to detect such selected events and to instruct the cursor controller 20 to automatically place the cursor image in the overscanned area of the video display 121. The timer 40 can be used to delay the placement of the cursor in the overscanned area by delaying the instruction from the controller 150 to the cursor controller 20 by a fixed or user variable period of time.

The selected events which the controller 150 is programmed to detect can be triggered in a variety of ways. User commands or entries are communicated to the controller 150 from the remote control transmitter 60 via the remote control receiver 50. Similarly, user commands or entries are communicated to the controller 150 from the keyboard 80 via the keyboard interface 70. Furthermore, the controller 150, which controls operation of the PC/TV convergence device 100, is aware of changes in the operating mode of the system. Changes in the mode of operation can be initiated by the user or can be a result of the programming of the PC/TV convergence device 100.

Figure 3:
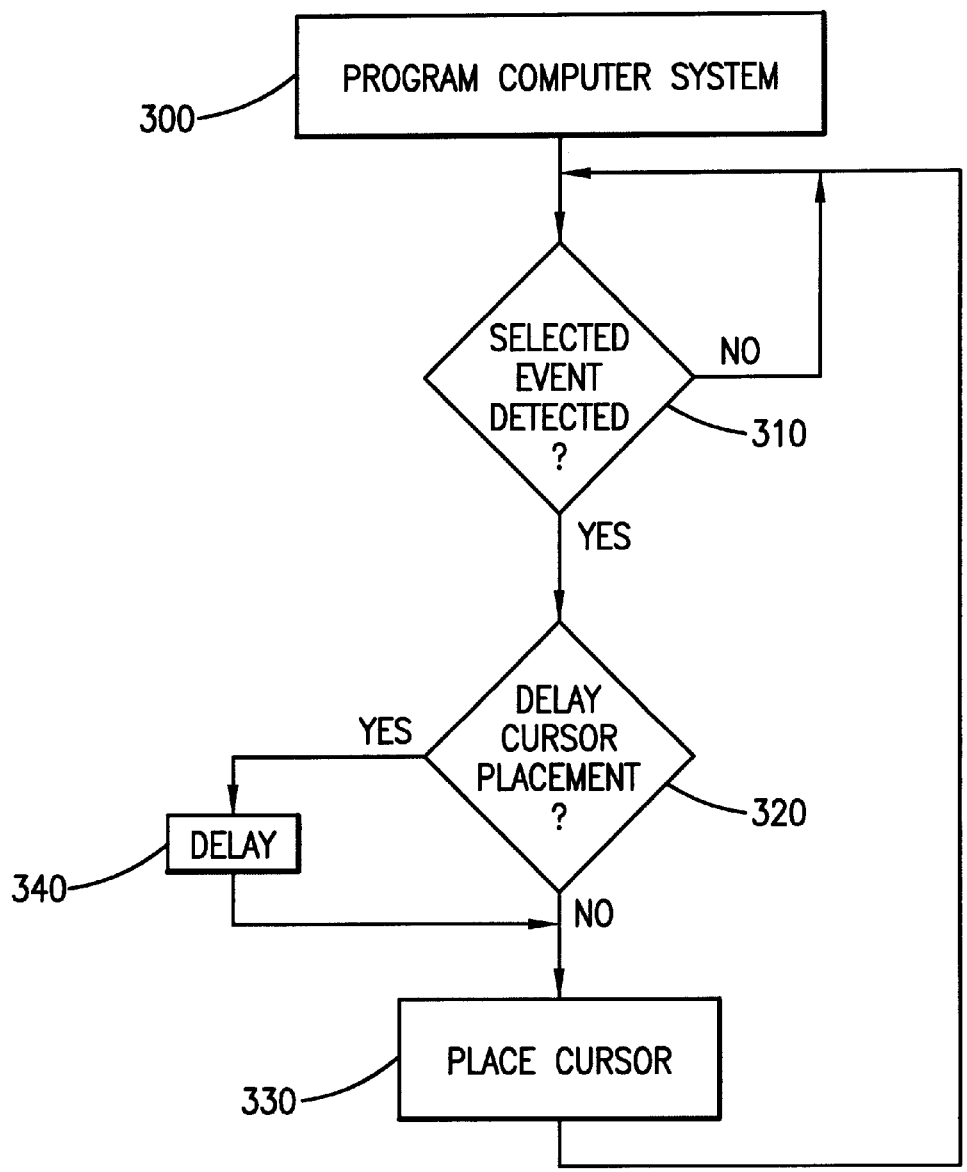
FIG. 3 is a flow diagram describing the method of the present invention.

Referring additionally now to FIG. 3, there is illustrated a flow diagram for the method of the present invention. The event detector 30 or the controller 150 is initially programmed to detect selected events (step 300) wherein the cursor image is to be placed in the overscanned area of the video display 10 or the video display 121. The event detector 30 or the controller 150 monitors various functions of the computer system as well as user entered commands to detect the occurrence of the selected events (step 310). When an event is detected, the event detector 30 or the controller 150 determines whether a delay is programmed to occur between the occurrence of the selected event and the placement of the cursor image (step 320). If no delay is to occur, the event detector 30 or the controller 150 instructs the cursor controller 20 to place the cursor image in the overscanned area of the video display 10 or the video display 121 (step 330). Otherwise, if a delay is to occur, the event detector 30 or the controller 150 delays sending the instruction to the cursor controller 20 (step 340) by a preselected period of time. The event detector 30 or the controller 150 continuously monitors for the selected events by repeating step 310.

Although a preferred embodiment of the apparatus of the present invention has been illustrated in the accompanying Drawings and described in the foregoing Detailed Description, it will be understood that the invention is not limited to the embodiment disclosed, but is capable of numerous rearrangements, modifications and substitutions without departing form the spirit of the invention as set forth and defined by the following claims.

What is claimed is:

1. A computer system comprising:
    a cursor controller for generating a cursor image and controlling movement of the cursor image on a display, the cursor controller further for automatically placing the cursor image in an overscanned area of the display in response to detection of at least one selected event where the cursor image is to be removed from a viewing area of the display; and
    an event detector for selectively detecting the at least one event, the event detector further for communicating detection of the event to the cursor controller.

2. The computer system recited in claim 1, wherein the event detector further includes a timer for delaying communication of the detection of the event to the cursor controller.

3. The computer system recited in claim 1, further including a mode controller for controlling the operating modes of the computer system, the mode controller further for communicating the operating mode to the event detector.

4. The computer system recited in claim 1, further including a remote control receiver for receiving user commands transmitted to the computer system via a remote control transmitter, the remote control receiver further for communicating user commands to the event detector.

5. The computer system recited in claim 1, further including a keyboard interface for receiving user commands communicated to the computer system via a keyboard, the keyboard interface further for communicating user commands to the event detector.

6. The computer system recited in claim 1, wherein the event to be viewed with the cursor image removed from the viewing area of the display is activation of motion video.

7. A PC/TV convergence device comprising:
    a display for receiving and displaying images;
    a computer coupled to the display, the computer for executing programs and for generating images to be displayed on the display;

a cursor controller for generating a cursor image to be displayed on the display and for controlling cursor image movement on the display, the cursor controller further for automatically placing the cursor image in an overscanned area of the display in response to detection of at lease one selected event where the cursor image is to be removed from a viewing area of the display;

a controller for controlling operation of the PC/TV convergence device, the controller for selectively detecting the at least one event and further for communicating the detection of the event to the cursor controller.

8. The PC/TV convergence device recited in claim 7, wherein the event to be selectively detected is activation of the television functionality mode of the PC/TV convergence device.

9. The PC/TV convergence device recited in claim 7, further including a remote control receiver for receiving user commands transmitted to the PC/TV convergence device via a remote control transmitter, the remote control receiver further for communicating user commands to the controller.

10. The PC/TV convergence device recited in claim 7, further including a keyboard interface for receiving user commands communicated to the PC/TV convergence device via a keyboard, the keyboard interface further for communicating user commands to the controller.

11. The PC/TV convergence device recited in claim 7, wherein the controller further includes a timer for delaying communication of the detection of the selected event to the cursor controller.

12. The PC/TV convergence device recited in claim 11, wherein the timer is set to a fixed value.

13. The PC/TV convergence device recited in claim 11, wherein the timer is user variable.

14. The PC/TV convergence device recited in claim 7, wherein the cursor controller and the controller and their respective functionality reside in, and are performed by, the computer.

15. A method for automatically placing a cursor image of a computer system in an overscanned area of a display comprising the steps of:

programming the computer system to detect at least one selected event wherein the cursor image is to be removed from a users view;

detecting the occurrence of the selected event; and instructing a cursor controller to place the cursor image in the overscanned area of the display.

16. The method recited in claim 15, wherein the step of programming the computer system includes programming the computer system to detect activation of motion video.

17. The method recited in claim 15, wherein the step of instructing the cursor controller further includes delaying the instructing of the cursor controller by a programmed time interval.

18. A computer system operable in a first mode and a second mode comprising:

a cursor controller for generating a cursor image and controlling movement of the cursor image on a display, the cursor controller further for automatically placing the cursor image in an overscanned area of the display in response to detection of at least one selected event where the cursor image is to be removed from a viewing area of the display; and an event detector for selectively detecting the at least one event, the event detector further for communicating detection of the event to the cursor controller.

19. The system recited in claim 18, wherein the first mode is a computer functionality mode, and wherein the second mode is a television functionality mode.

* * * * *